United States Patent Office 3,350,277
Patented Oct. 31, 1967

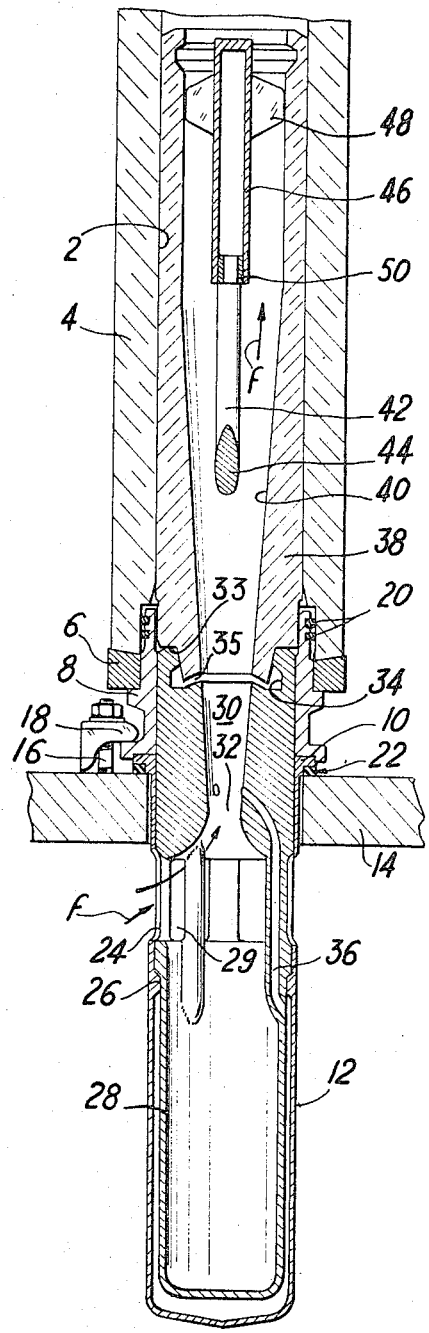

3,350,277
FLOW-LIMITING DEVICE, ESPECIALLY FOR NUCLEAR REACTORS
Didier Costes, Paris, France, assignor to Commissariat a l'Energie Atomique, Paris, France
Filed Mar. 24, 1966, Ser. No. 537,131
Claims priority, application France, Apr. 2, 1965, 11,799
4 Claims. (Cl. 176—87)

ABSTRACT OF THE DISCLOSURE

Each channel of a gas cooled nuclear reactor is provided at its bottom with a catchpot for debris and a Venturi located above the catchpot with the gas inlet ducts disposed at the top of the catchpot and beneath the Venturi. A duct at the throat of the Venturi supplies a downward pressure on the catchpot to hold it in place and the cross section of the throat provides an upward flow gas rate less than that which would displace the fuel cartridges.

---

This invention relates to a device for limiting the rate at which a fluid is admitted into a channel, as applicable in particular to heterogeneous nuclear reactors which are cooled by an upward flow of coolant gas within the fuel channels and as designed with a view to preventing "levitation" of fuel cartridges located within said channels.

One known solution for limiting the flow rate of fluid admitted into a channel consists in effecting this admission by means of a Venturi tube having a cross-sectional area at the throat which is determined as a function of the maximum flow rate adopted. Thus, if the upstream pressure remains stable, the maximum flow rate will be determined at a fixed value corresponding to the velocity of sound at the Venturi throat under the conditions of pressure which are contemplated.

In certain cases, it must be possible to modify the value of the maximum flow rate without difficulty. In the case in which the channel is accessible from the upstream side, it is then merely necessary to insert the Venturi tube in the channel and to place said tube in abutting contact with an internal annular shoulder of the channel. Thus, the Venturi tube can be readily removed when no fluid is flowing through it. In the contrary case, the Venturi tube will be locked as a result of the pressure of the fluid.

On the other hand, this solution is no longer practicable if the pipe is accessible only on the downstream side. Accordingly, it is a primary object of this invention to provide a device which permits of easy replacement of the Venturi tube while maintaining this latter locked in position during operation.

To this end, the device in accordance with the invention for limiting the flow of fluid admitted into a pipe consists of fluid admission ports formed in the channel wall, a Venturi tube placed in the channel in abutting contact with an internal shoulder of said channel and having a cross-sectional area at the Venturi throat such that the flow through said throat attains the velocity of sound at the maximum flow rate, and a duct for providing a communication between said throat and the space which is formed between the closed end of the channel and a member forming part of the Venturi tube and so designed as to afford a sliding junction with the channel wall upstream of said ports.

Said device can be employed in particular as an anti-levitation system in nuclear reactors.

The term "levitation" is understood to refer to a process which takes place especially during on-load discharge of reactors of the upward coolant flow type which are refuelled from the top face of the reactor. In this process, the aerodynamic force which is exerted by the coolant on the fuel element or cartridge located at the top of the standpipe, as increased by the partial discharge of the fuel channel, may exceed the weight of said fuel cartridge and thus project this latter upwards.

The device which is usually provided for the purpose of circumventing this danger consists in producing a counter-blowing flow from the discharge machine to the fuel channel. In regulating the counter-blowing flow which is produced by the discharge machine, numerous parameters must be taken into account such as the number of fuel cartridges remaining to be discharged, rated power of the channel, blowing pressure, and so forth. The device is therefore of complex design and any malfunction is therefore liable to be attended by serious consequences such as levitation of fuel elements from a channel, overheating of fuel cans and the like.

The present invention is also directed to the design concept of an anti-levitation device which circumvents the disadvantages referred-to above but without entailing the incorporation of additional elements. As is already known, provision is usually made at the lower end of the fuel channel, especially in reactors of the carbon dioxide gas cooled type in which the fuel elements or cartridges are fitted with a sleeve of moderator material, for a removable debris collector or so-called "catchpot." The anti-levitation device in accordance with the invention comprises a Venturi tube which is disposed on the catchpot between the coolant gas inlet ports formed in said catchpot and the outlet of this latter in the fuel channel, said Venturi tube having a cross-sectional area at its throat such that the coolant gas attains the velocity of sound at a flow rate within the channel which is lower than that which would result in levitation of the fuel cartridges, the throat of the Venturi (at which the prevailing pressure is lower than the pressure upstream) being adapted to communicate with the lower end of the catchpot so as to result in the appearance of vertical and downwardly-acting pressure forces which apply the catchpot against a stationary annular supporting bulge.

A better understanding of the invention will be had from a perusal of the following description of one preferred form of embodiment which is given by way of example and not in any limiting sense. Reference is made in the description to the single figure of the accompanying drawings which shows in longitudinal cross-section the lower end of the core channel of a graphite-moderated carbon dioxide gas cooled reactor as equipped with a device according to the invention.

The vertical core channel 2 through which carbon dioxide coolant gas is circulated upwardly is built up of juxtaposed bores formed in a column of graphite bricks such as the brick 4 which are coupled with the bricks of adjacent columns by means of longitudinal keys, not shown. Each moderator column is carried by a concave bearing ring 6, a spigot ring 8 and the top flange 10 of a shutter tube or channel extension 12 (which will be described hereinafter) on a support plate or diagrid 14. The spigot ring 8 and the flange 10 are held applied against the diagrid by means of studs such as the stud 16 and clamps such as the clamp 18. O-ring seals 20 and 22 are designed to prevent leakage respectively between the bore 2 and the spigot ring 8 and between the flange 10 and the diagrid 14.

The shutter tube 12 is made up of a tubular member which is closed at the lower end; there is formed in the side wall of the shutter tube a series of elongated openings 24 which are uniformly spaced around the axis and which are intended to provide passageways for the carbon dioxide gas which flows in the direction of the arrows f.

The shutter tube 12 is provided beneath the openings 24 with an internal annular bulge 26 forming a support for a debris collector 28 which is commonly known as a "catchpot," this term being accordingly employed in the remainder of the description.

In accordance with the invention, the catchpot 28 consists of a bottom portion provided with ports 29 for the admission of the carbon dioxide coolant gas and a top portion for limiting the flow rate of the coolant to a value which is lower than that which would result in levitation of fuel cartridge placed within the reactor channel 2. The ports 29 are preferably located at the same level as the openings 24.

The upper portion of the catchpot 28 comprises an axial duct forming a Venturi 30, the throat 32 of which has a cross-sectional area which usually ranges from one-twentieth to one-quarter of the cross-sectional area provided for the flow of coolant gas within the fuel cartridges which are located within the channel. More specifically, the cross-sectional area at the Venturi throat 32 has a value such that the flow of coolant gas through said throat attains the velocity of sound whereas the flow velocity within the channel has a value below that which would produce levitation of the fuel cartridges. In other words, should the total head loss coefficient of the channel decrease for any reason (for example as a result of the removal of a certain number of fuel cartridges) whilst the difference in driving pressure between the upstream end of the catchpot and the downstream end of the fuel channel remains substantially constant, then the coolant flow velocity evidently increases but is limited to the value which is reached at the Venturi throat 32 and which corresponds to the velocity of sound.

The top portion of the catchpot 28 is usefully provided with an annular groove 34 so as to permit the engagement of a grab (not shown in the drawings) for charging and discharging fuel cartridges. The top face of the catchpot can also accommodate the lowermost fuel element or dummy cartridge 38 which is usually placed in a core channel.

In order to lock the catchpot against the annular bulge 26 as long as the coolant gas flows through the channels at a sufficiently high velocity, provision is usefully made for a series of ducts such as the duct 36 which serve to connect the Venturi 30 to the space formed between the base of the catchpot and the base or end wall of the shutter tube 12.

The ducts 36 open into the Venturi 30 in the vicinity of the throat 32 either in a radial direction or at an acute angle of inclination to the general direction of flow of coolant gas. The pressure which is developed within the ducts 36 and consequently beneath the base of the catchpot is either equal to or lower than the pressure head of the flow at the Venturi throat, said pressure head at a flow rate corresponding to the velocity of sound being of the order of 0.6 times the upstream pressure head. Since this value is considerably lower than the pressure which can be developed downstream of the Venturi, the catchpot is thus held applied by pressure forces against the annular bulge 26 and is thus prevented from escaping. By reason of the limited length of the objects which can be handled within the reactor channel, it may be found necessary to truncate the Venturi 30 within the catchpot 28 and to extend its delivery cone (which is essential in order to obtain a small head loss) within the dummy cartridge of non-absorbing material which usually surmounts the catchpot and supports the fuel element sleeves. There is shown in the figure a dummy cartridge 38 of graphite with an axial divergent tube or delivery cone 40 which forms an extension of the Venturi. Said dummy cartridge rests on the catchpot 28 by means of a circular bearing zone 33 formed above the annular groove 34; the underface of the dummy cartridge is put into pressure communication with the flow downstream of the delivery cone 40 by virtue of an annular gap 35 which is advantageously oriented downstream in the same manner as the ducts 36 at the point at which these latter open into the Venturi 30. The pressure which is thus produced beneath the dummy cartridge is lower than that which prevails on the upper surfaces and the dummy cartridge is thus locked pneumatically onto the catchpot 28, thereby preventing any levitation of the relatively lightweight dummy cartridge.

The catchpot is designed to receive the graphite debris which may fall from the moderator bricks and fuel cartridge sleeves.

In the event of a fault condition occurring in which one or a number of fuel elements were to break loose from their graphite sleeves and fall into the channel, said fuel elements would accordingly be stopped by the dummy cartridge 38 and by the Venturi tube 30.

It may prove advantageous to mount a fall-damping device within the dummy cartridge. Accordingly, the dummy cartridge which is illustrated by way of example in the figure is fitted with a central damping device of any suitable type comprising, for example, a vertical rod 42 of soft metal (such as a light alloy, for example), the lower end of which is secured to the sleeve by means of a cross-member 44. A bushing 46 is fitted over said rod and centered in the sleeve by means of lugs 48. Teeth 50 of hard material such as steel are formed on the end of said bushing for the purpose of scoring the rod when said bushing is driven downwardly over the rod as a result of an impact on the top face thereof. The deformation of the rod 42 during this drifting process produces the necessary damping action.

Subject to a relatively small head loss in continuous operation (when the channel is fully charged), levitation of fuel elements during refuelling operations is thus prevented with complete safety and reliability. It should be noted in addition that the device according to the invention can readily be adapted to the equipment of reactors which were not initially designed for the utilization of a system of this type. In fact, it is merely necessary to replace the catchpot as well as the conventional dummy cartridge which may have been provided. It should be pointed out also that the invention permits the modification of the design flow characteristics of a reactor channel, simply by replacing the Venturi tube. In the case of those channels which have the lowest power, the cross-sectional area at the Venturi throat can be such that the Venturi operates continuously at a sonic flow velocity, thus ensuring unvarying flow even during discharge of a channel.

The invention is not limited in any sense to the mode of construction or application hereinabove described and it must be understood that the scope of this patent extends to alternative forms of either all or a part of the arrangements described which remain within the definition of equivalent means.

I claim:

1. In a device for limiting to a predetermined value the rate of admission of a fluid into a channel section: a channel extension located upstream of said channel section and closed at its end remote from said channel section; admission openings formed in the lateral wall of said channel extension for admitting said fluid into said channel; a Venturi within said channel extension in abutting connection with an annular shoulder of the channel extension whereby displacement of said Venturi in the direction of the closed end of said extension is prevented, said Venturi connecting said openings to said channel section and having a cross-sectional area at the throat such that the flow of fluid through said throat attains the velocity of sound at said predetermined admission rate; and a duct connecting the Venturi throat, in which the pressure is below that which prevails within said channel, with a space formed between said closed end and a wall which is fast with said Venturi.

2. In a device for limiting the rate of admission of a fluid coolant into a vertical nuclear-reactor fuel channel which accommodates nuclear fuel cartridges: a channel extension located under said fuel channel and closed at its end remote from said fuel channel portion; coolant fluid admission openings formed in the lateral wall of said channel extension; a debris collector slidably received in the channel extension in abutting contact with an internal shoulder of said channel extension; a Venturi formed in said collector, connecting said fuel channel and openings and having a cross-sectional area at the Venturi throat such that the flow through said throat attains the velocity of sound at said maximum flow rate; and a duct communicating said throat and the space between the closed end of the channel and said collector whereby the pressure forces on said collector forcibly apply the same against said internal shoulder.

3. Device in accordance with claim 2, wherein said cross-sectional area at the Venturi throat is such that the coolant fluid attains the velocity of sound at a rate of flow within the reactor channel which is lower than that which results in levitation of a fuel cartridge.

4. Device in accordance with claim 2, wherein said debris collector is adapted to slide within an internal annular bulge of said extension, said annular bulge being provided with a bearing face which constitutes said internal shoulder.

References Cited

UNITED STATES PATENTS 3,235,465  2/1966  McDaniel et al. _____ 176—61

REUBEN EPSTEIN, *Primary Examiner.*